UNITED STATES PATENT OFFICE.

CHARLES A. DOREMUS, OF NEW YORK, N. Y.

PRODUCTION OF ALUMINUM SALTS.

1,391,172.  Specification of Letters Patent.  Patented Sept. 20, 1921.

No Drawing.  Application filed October 28, 1919.  Serial No. 333,914.

*To all whom it may concern:*

Be it known that I, CHARLES A. DOREMUS, a citizen of the United States, and a resident of New York, in the county and State of New York, have invented a new and useful Improvement in the Production of Aluminum Salts, of which the following is a specification.

My invention relates to the production of aluminum salt solutions, such for example as aluminum fluorid solutions, by an acid process, from which solutions the metal may subsequently be derived.

It has for its object to simplify, improve and cheapen the production of solutions of aluminum salts, to produce a process that is applicable to many alumina-bearing ores heretofore difficult to treat; also to remove certain objectionable features present in the known processes for the production of such solutions or in the products derived therefrom. It consists of the novel process for producing such solutions herein described.

Heretofore there have been two general processes used for obtaining aluminum salt solutions in the production of the metal aluminum, one known as the acid process, in which acid, usually sulfuric acid, is employed, and the other known as the alkali process. Each of these processes has its limitations and objectionable features.

Thus, the acid process is suitable for use only upon such alumina-bearing ores as have relatively small contents of iron compounds or silica or titanium oxid. When the iron content is large, as in some bauxite, or where it runs as high as twenty-five per cent. (25%) ferric oxid ($Fe_2O_3$), or higher, or the silica content ($SiO_2$) substantially exceeds three per cent. (3%), as where, for example, it is five per cent. or over, or where there are substantial amounts of other impurities such as titanium oxid ($TiO_2$), the acid process gives a highly ferruginous or otherwise impure solution, in which it is practically impossible to separate the aluminum from the iron or silica or other impurity. In the acid process when attempted with such ores, nearly all the iron goes into solution while much of the alumina stained with iron oxid, remains as the residue. And even where great excess of the ore is added, the solution does not become neutral even on protracted digestion. Moreover, the resulting solution is not useful for producing anhydrous alumina, which is the basis for winning the metal itself.

In the acid process as heretofore practised, the ore is not roasted or calcined.

The alkali process must be resorted to where the ore contains such excess of iron compounds but it is not applicable to highly silicious ores or to clay. It is, moreover, an expensive process requiring large amounts of fuel, costly installations and many workmen. The product is also not free from soda, one per cent. or more often remaining, which is a very objectionable feature.

In preparing the ore for the alkali process it is usual, before shipment, to roast the ore, but this is only for the purpose of driving off water to reduce weight and volume to save freight charges. It has also been customary at times when found necessary, to roast the ore to destroy objectionable organic matter that may be present in it. But the roasting forms no part of the alkali process itself and plays no part in the chemical reactions that take place in such process. The alkali process proceeds along entirely different chemical lines from the acid process to which my improvement relates.

I have discovered that, if in the acid process, especially where hydrofluoric acid is used, the alumina-bearing ore, even if containing a large excess of iron compounds, silica or titanium oxid, such as twenty-five per cent. (25%) or more of iron, five per cent. (5%) or more of silica, and three or four per cent. or more of titanium oxid, is first roasted or calcined, preferably to a dull red heat, (or about 540° C. or 1004° F.), and is then thoroughly mixed with acid, preferably aqueous hydrofluoric acid, in suitable proportions, a rapid and vigorous reaction takes place, producing a neutral solution of soluble aluminum fluorid, and leaving the iron compound, silica and titanium oxid insoluble, and making their complete separation, as by filtering, easy of accomplishment.

My improved process as carried out by me in its preferred form is as follows: Hydrofluoric acid, say 397 pounds of sixteen per cent. (16%) strength, is placed in a wooden vessel, and if necessary is heated in any suitable manner as, for example, with live steam. The alumina-bearing ore is ground to a finely powdered condition as through an eighty mesh sieve, and is then roasted or calcined to about a dull red heat of 540° C. or 1004° F. The roasted powdered ore, say one hundred pounds (assuming the ore to contain sixty per cent. $Al_2O_3$, which allows ten per cent. excess of ore for the acid used,) is then rapidly stirred in with the acid, the feed being controlled by the reaction taking place as the temperature of the acid rises rapidly to 100° C. The mixture is vigorously stirred for a short time. The reaction takes place promptly and vigorously and is considered complete when the solution does not impart any color to tropæolin 00. For the purpose of controlling the reaction and making the solution neutral, there should be added to the mixture from time to time during the operation, a suitable excess of the roasted ore.

During the operation a rapid and vigorous reaction takes place, which leaves the iron, silica and titanium oxid insoluble, as a red residue, and produces soluble aluminum fluorid.

The soluble aluminum fluorid and the insoluble impurities are then separated from one another in any usual manner as by a suitable filter. If necessary, a second or clear filter may be used to catch any traces of the fine insoluble material that has come through by the first filtration, or is formed during the period of filtration. The residue is preferably washed methodically, that is, the first wash water may go directly to the filtrate, while the next portions are reserved as the first wash for the next batch. This keeps the liquor to be crystallized at high concentration.

The result of my improved process is a clear neutral liquid, forming a strong solution of aluminum fluorid with only traces of impurities, and essentially free from iron oxid, silica, titanium oxid and the alkalis. This liquid is now ready for any suitable further treatment such as obtaining therefrom crystals of aluminum fluorid.

It will be understood of course that the proportions of the ingredients used in the specific formula above given may be varied to meet varying conditions of the ore, &c. In the said specific formula sixteen per cent. (16%) strength of hydrofluoric acid was used because it has been found that this strength of acid, produces when hot, a solution which contains the maximum amount of aluminum fluorid. The ore may be roasted in any manner, but I find it advantageous to roast it after it has been finely divided.

In case any iron salt might by chance pass into the filtrate after the clear filtration, contamination of the aluminum salt can be prevented by the addition of a small amount of a reducing agent such as sulfur dioxid, $SO_2$.

What I claim as new and desire to secure by Letters Patent, is:

1. The process of producing aluminum salt solutions from alumina-bearing ores containing relatively large amounts of impurities such as iron compounds, silica or titanium oxid, which consists in roasting the ore, mixing it in suitable proportions with an acid capable of dissolving the alumina but leaving the other constituents as an insoluble residue, and separating the soluble aluminum salt and the insoluble residue.

2. The process of producing aluminum fluorid solutions from alumina-bearing ores containing relatively large amounts of impurities such as iron compounds, silica or titanium oxid, which consists in roasting the ore, mixing it with hydrofluoric acid in suitable proportions, and separating the soluble aluminum fluorid and the insoluble residue.

3. The process of producing aluminum fluorid solutions from alumina-bearing ores containing relatively large amounts of impurities such as iron compounds, silica or titanium oxid, which consists in roasting the ore to about a dull red heat, mixing it with hydrofluoric acid in suitable proportions, and separating the soluble aluminum fluorid and the insoluble residue.

4. The process of producing aluminum fluorid solutions from alumina-bearing ores containing relatively large amounts of impurities such as iron compounds, silica or titanium oxid, which consists in roasting the ore to about a dull red heat, stirring it in rapidly in suitable proportions into a solution of hydrofluoric acid, adding an excess of the ore until the mixture becomes neutral, and separating the soluble aluminum fluorid and the insoluble residue.

5. The process of producing aluminum fluorid solutions from alumina-bearing ores containing relatively large amounts of impurities such as iron compounds, silica or titanium oxid, which consists in finely powdering the ore, roasting it to about a dull red heat, stirring it rapidly into a warm solution of hydrofluoric acid of suitable strength, adding an excess of the ore, and continuing the operation until the mixture becomes neutral, and filtering the mixture to separate the insoluble impurities from the soluble aluminum fluorid.

In testimony whereof, I have signed my name to this specification.

CHARLES A. DOREMUS.